United States Patent Office 3,053,547
Patented Sept. 11, 1962

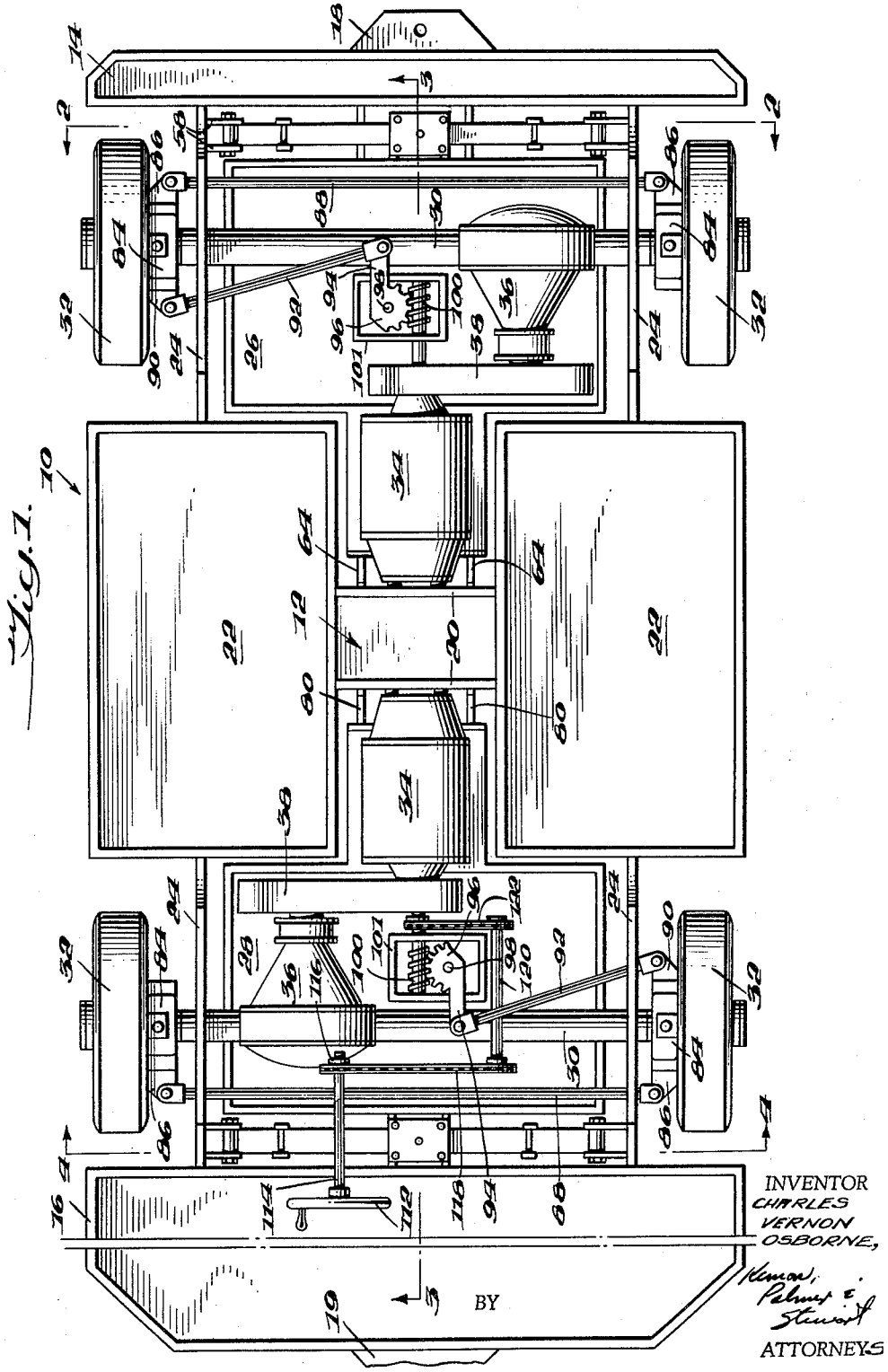

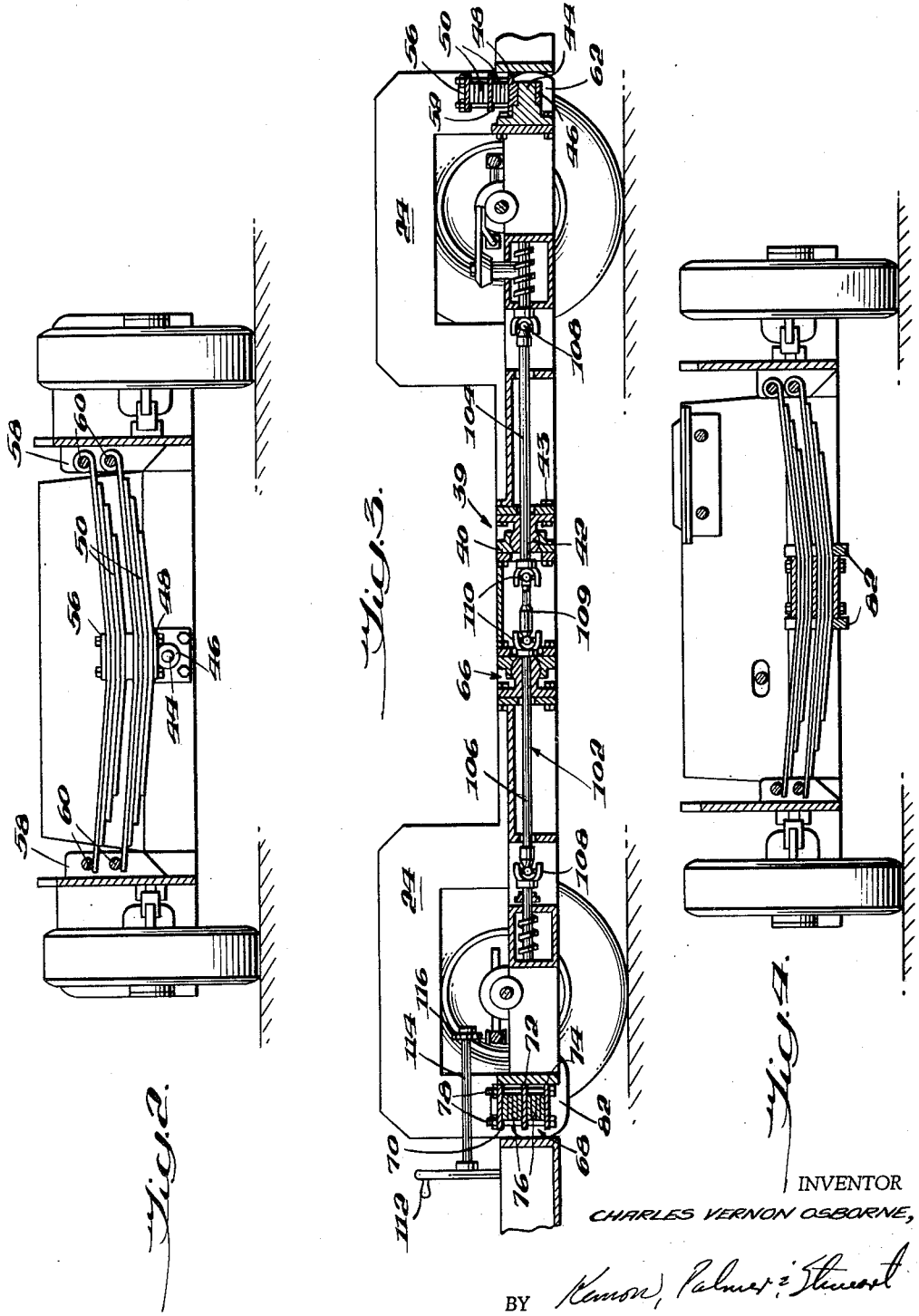

3,053,547
PIVOTAL SUB-FRAME ARRANGEMENT
FOR MINE TRACTOR
Charles Vernon Osborne, Wise, Va.
Filed Oct. 13, 1960, Ser. No. 62,445
5 Claims. (Cl. 280—112)

This invention relates to motor vehicles, and more particularly, to electric motor powered tractors of the type used in mining.

In Patent No. 2,944,830, issued on July 12, 1960, there is disclosed a combination motor car and four wheeled steering mechanism wherein a rotatable steering shaft extends centrally and longitudinally of the car body in a manner so as to be useable not only as one of the essential components of the steering mechanism but also as a support member for a pivotal subframe organization, thereby reducing in number the necessary structural components and accordingly enabling a mine car which is extremely compact and effective for its intended purpose. The present invention relates to a mine tractor of the same general type which the aforementioned patent discloses except in this instance, certain improvements have been made in the frame and steering organization as well as the suspension system, which improvements represent a material advance in this art.

Accordingly, an object of the present invention is to provide a new and improved electric motor car having particular utility in the mining industries.

Another object of this invention is that of providing a mine tractor of the type referred to with a new and improved steering mechanism and frame organization by which a resilient suspension is made possible without in any way mitigating such features vital to mine tractors as under clearance, overall height, and steerability.

A further object of this invention is the provision of a mine tractor of the type in which the front and rear wheel and axle assemblies support sub-frames which in turn carry a main frame, at least one of the sub-frames being mounted in the main frame for relatively unrestricted pivotal movement about a central longitudinal axis to effect independent front and rear wheel mountings, and wherein the sub-frame to main frame connection incorporates resilient means to bring about a spring suspension system for the main frame.

Other objects and further scope of applicability of the present invention will become apparent from the detailed description given hereinafter. It should be understood, however, that the detailed description which indicates preferred embodiments of this invention is given by way of illustration only, since it will become apparent from this description to those skilled in the art, that various changes and modifications can be made without departing from the true spirit and scope of this invention.

In general, the aforementioned objects are accomplished by a mine tractor having in combination, a main frame including a central transverse section spaced longitudinally from a pair of transverse end sections by longitudinally extending side members, the main frame being carried on a pair of sub-frames which in turn are supported on powered, steerable wheel and axle assemblies. The sub-frames are both connected to the central section of the main frame through a universal or ball and socket type joint and each to their respective transverse end sections through resilient means preferably in the form of transverse leaf springs. Further, the tractor incorporates a four wheel steering mechanism including a longitudinally extending rotatable steering shaft disposed concentrically within the sub-frame to main frame universal connections so that virtually no additional space in the tractor is required for the steering shaft other than that which already exists to effectively inter-connect the main frame and sub-frame assembly.

A more complete understanding of the mine tractor of this invention may be had by reference to the accompanying drawings in which:

FIG. 1 is a plan view showing the essential frame, steering, and suspension organization of this invention;

FIG. 2 is a cross-sectional view taken along line 2—2 of FIG. 1;

FIG. 3 is a cross-sectional view taken longitudinally of the mine tractor along line 3—3 of FIG. 1; and FIG. 4 is a cross-sectional view taken along line 4—4 of FIG. 1.

Referring to FIG. 1 of the drawings, it will be noted that the mine tractor of this invention includes a main frame generally designated by the numeral 10, having a central transverse section indicated generally at 12 and a pair of front and rear transversely extending end sections 14 and 16 respectively. The rear section 16 is of sufficient size to permit an operator to be supported thereon while the front transverse section 14 serves principally as a bumper as well as a support for a draft bracket 18. A similar bracket partially shown at 19 may be affixed to the rear transverse section or operator's platform 16. The central transverse section 12 is preferably formed with a pair of transverse beam members 20 which connect at their ends to a pair of battery supporting platforms 22, in turn connected to the front and rear transverse sections 14 and 16 by longitudinally extending side members 24. As shown in FIG. 3, the side members 24 are of inverted U-shaped configuration to facilitate relative movement between the main frame 10 and the wheels which will become apparent from the description following below.

Positioned within the main frame 10 between the central transverse section 12 and the end transverse sections 14 and 16 thereof are front and rear sub-frames 26 and 28 respectively. Each of these sub-frames is connected to and thus supported on an axle 30 mounting wheels 32, and further, support the motive power components by which the wheels are driven. These components include an electric motor 34, differential gearing 36 and a flexible drive transmission indicated at 38. The motors 34 receive their electrical energy from batteries (not shown) adapted to be supported on the platforms 22.

The connection of the front sub-frame 26 within the main frame 10 is illustrated in FIGS. 1, 2, and 3 of the drawings and includes a universal pivotal connection 39 to the main frame central transverse section 12 including a socket member 40 fixed to the front transverse beam member 20 such as by bolts, welds, rivets, or the like and a ball member 42 rigidly secured to the rear of the sub-frame 26 such as by bolts 43 though other connecting means such as welding or riveting may be used. Projecting forwardly of the sub-frame 26 and rigidly fixed thereto is a stub shaft 44 which carries rotatably a sleeve 46 having a plate 48 welded or formed integrally thereon. A pair of leaf springs 50 separated by a plate 52 are rigidly fixed to the plate 48 and thus the sleeve 46 by a plurality of bolts 54 passing through an upper plate 56 the spacing plate 52 and the sleeve carried plate 48 firmly anchor the springs together and to the sleeve 46. Since the sleeve 46 is rotatable about the shaft 44 which in turn is rigidly supported at the forward end of the sub-frame 26, it will be understood that the springs 50 are pivotally fixed to the forward end of the sub-frame.

The side members 24 adjacent the sub-frame 26 carry inwardly directed brackets 58 supporting pins 60 rigidly on the main frame 10. As shown in FIG. 2, the leaf springs 50 are pivotally connected at one side of the main frame to the pins 60 while the pins on the opposite side of the main frame merely rest on the springs. Thus, there is no resistance to spring flexure as might occur by anchorage of both ends of the spring to the main frame.

To reduce any tendency of the sub-frame 26 to move longitudinally within the main frame 10, pairs of front and rear buffer chocks 62 and 64 respectively are rigidly fixed to the front and rear of the sub-frame and arranged to engage slideably the front beam 20 of the central transverse section 12 and the front transverse section 14, the front chocks being omitted in FIG. 2. Thus, it will be appreciated by those familiar with this art that the sub-frame 26 though unrestricted in pivotal movement with respect to the main frame 10 because of the ball and socket joint 39 and the stub shaft 44 yet no longitudinal movement between the sub-frame and the main frame can take place due to the buffer chocks 62 and 64. Further, since the weight of the front portion of the main frame 10 is supported on the springs 50, a spring suspension thereof is effected on the front axle 30.

The connection of the rear sub-frame 28 to the main frame 10 is similar to the front sub-frame 26 in the sense that it includes a ball and socket joint 66 and a transverse leaf spring assembly 68 including a top plate 70 a spacer plate 72 and a bottom plate 74 sandwiching a pair of leaf springs 76 with vertically disposed bolts 78. Likewise, a pair of buffer chocks 80 are disposed between the forward end of the rear sub-frame 28 and the rearwardly disposed transverse member 20 of the central transverse main frame section 12. However, the connection of the leaf springs 76 to the rear sub-frame 28 is a rigid connection such that no pivotal movement between the leaf springs and the sub-frame 28 is permitted as in the connection of the front leaf spring 50 to the front sub-frame 26. Accordingly, the lower plate 74 of the spring assembly 68 is rigidly fixed to a pair of rearwardly extending buffer chocks 82 such as by welding or the like. The chocks 82 along with the chocks 80 function to retain the rear sub-frame 28 against longitudinal displacement in the main frame 10 in the same manner as the chocks 62 and 64 of the front sub-frame 26. Also, since the transverse spring members 76 are rigidly attached to the rear end of the sub-frame 28 by connection thereof to the chocks 82, the only pivotal movement of the sub-frame 28 about the longitudinal axis thereof with respect to the main frame 10 is that which is permitted by the resilience of the leaf springs themselves. The support of the main frame on the rear sub-frame springs 76 is substantially identical with the support thereof on the front sub-frame 26 and no additional description thereof is deemed necessary.

Steerage of the mine tractor is brought about by the simultaneous pivoting of the front and rear wheels in opposite directions so that increased steerability is obtained. For this reason, the wheels 32 are rotatably received on stub axles 84 pivotally connected to the axles 30 in a manner well-known to those familiar with the art. The stub axles in each instance include lever extensions 86 to which a tie rod 88 is connected in each of the respective wheel and axle assemblies. The use of such tie rods is well-known in the art and functions to assure the same turning angle in each of the wheels on opposite ends of the axles. At least one of the stub shafts 84 in each of the wheel and axle assemblies, is provided with a second lever arm extension 90 to which one end of a drag link 92 is pivotally connected, the other end of the drag link being pivotally connected to a lever 94 on a gear segment 96 rotatably received on a shaft 98 to be driven by a worm 100.

The worms 100, are journaled in boxes 101 carried on the sub-frame and inter-connected by a rotatable steering shaft extending longitudinally and centrally of the tractor, designated generally by the numeral 102. The steering shaft is formed having front and rear shaft elements 104 and 106 respectively connected to the worms 100 through universal joints 108. As shown in FIG. 3 of the drawings, the shaft elements 104 and 106 are journaled concentrically wtihin the ball members of the ball and socket joints 39 and 66 and inter-connected by a telescopic shaft element 109 along with universal joints 110 to accommodate movement of the sub-frames about their respective ball and socket joints.

Rotation of the steering shaft 102 is brought about by manual rotation of a steering wheel 112 fixed on a shaft 114 supported on the sub-frame 28 in bearings (not shown) and which, on its other end, mounts a sprocket 116 engageable with a chain 118 for driving a sprocketed shaft 120 which in turn drives rotatably the steering shaft 102 through a chain 122.

In use, power delivered to the wheels 32 by the motors 34 is controlled by the operator situated on the platform 16 by suitable control means not shown. Steerage to the right, for example, is initiated by rotating the steering wheel 112 in a clockwise direction as viewed from the left in FIG. 1 which, in turn, results in a clockwise rotation of the steering shaft 102 and thus the worms 100. Such clockwise rotation of the worms 100 results in an oscillatory movement of the levers 94 in opposite directions since they are on opposite sides of the worms 100 which movement is transmitted to the stub axles 84 by the drag links 92 to position the wheels angularly in position for a right-hand turn.

Thus, it will be seen from the foregoing description that the objects above mentioned are fully achieved by the present invention. The organization by which the sub-frames 26 and 28 are mounted in the main frame 10 enables all the desirable characteristics of independent suspension of front and rear wheels as well as a spring suspension of the main frame to be fully realized. Also, the use in such a mine tractor frame organization, of the steering mechanism described wherein the steering shaft is disposed concentrically within the universal ball and socket joints 39 and 66 connecting the sub-frames to the central transverse section 12 of the main frame permits effective four wheel steering without in any manner increasing the overall dimensions of the tractor body since all of the steering components may be disposed within the vertical extent of the frame members. Then too, the rigid connection of the rear spring members 76 to the rear sub-frame 28 as well as the provision of the buffing chocks between the sub-frames and the main frame members restricts in a desirable manner, certain relative movement between the sub-frames and main frames to permit effective operation of the tractor.

Since many possible changes may be made in this invention as hereinbefore set forth without departing from the spirit thereof, it is to be distinctly understood that the foregoing description is not intended as limiting but illustrative only and that the true spirit and scope of the present invention is to be determined by the appended claims.

I claim:

1. A mining tractor comprising in combination: a main frame including a transverse central section, a pair of transverse end sections and longitudinally extending side members connecting said sections; front and rear sub-frames between said central section and said end sections respectively; means connecting said sub-frames to said central section for universal pivotal movement with respect thereto; means resiliently supporting said end sections on said sub-frames; a pair of wheels supporting each of said sub-frames; and means for steering said wheels including a rotatable steering shaft extending longitudinally of said frame and centrally through said sub-frame to central section connecting means.

2. The combination recited in claim 1 in which each of said resilient connecting means comprises: a transverse leaf spring; means connecting the mid-portion of said spring to said sub-frames; and means supporting said frame on the ends of said springs.

3. The combination recited in claim 2 in which the means connecting the mid-portion of said spring to said sub-frame is a pivotal connection to one of said sub-frames and a rigid connection to the other of said sub-frames.

4. The combination recited in claim 1 in which each of said sub-frames carries buffer chocks on each end thereof slidingly engageable with said main frame transverse sections to resist longitudinal movement of said sub-frames in said main frames.

5. The combination recited in claim 1 in which said sub-frame to central section connecting means includes a ball and socket joint centrally apertured to receive said steering shaft.

References Cited in the file of this patent

UNITED STATES PATENTS

| | | |
|---|---|---|
| 1,276,046 | Evans | Aug. 20, 1918 |
| 2,251,584 | Fageol | Aug. 5, 1941 |
| 2,692,778 | Stump | Oct. 26, 1954 |
| 2,705,647 | Beck | Apr. 5, 1955 |
| 2,757,809 | Hagenbook | Aug. 7, 1956 |
| 2,944,830 | Osborne | July 12, 1960 |